(12) United States Patent
Verbeke et al.

(10) Patent No.: US 12,521,953 B2
(45) Date of Patent: Jan. 13, 2026

(54) 3D PRINTED CUSTOMIZED CUPSOLES

(71) Applicant: Huntsman International LLC, The Woodlands, TX (US)

(72) Inventors: Hugo Verbeke, Wilsele (BE); David Briers, Brussels (BE); Bram Vanroy, Haasrode (BE); Sandra Meynen, Tienen (BE)

(73) Assignee: HUNTSMAN INTERNATIONAL LLC

( * ) Notice: Subject to any disclaimer, the term of this patent is extended or adjusted under 35 U.S.C. 154(b) by 305 days.

(21) Appl. No.: 17/770,813

(22) PCT Filed: Nov. 6, 2020

(86) PCT No.: PCT/EP2020/081262
§ 371 (c)(1),
(2) Date: Apr. 21, 2022

(87) PCT Pub. No.: WO2021/089767
PCT Pub. Date: May 14, 2021

(65) Prior Publication Data
US 2025/0091309 A1    Mar. 20, 2025

(30) Foreign Application Priority Data
Nov. 8, 2019   (EP) .................................... 19207877

(51) Int. Cl.
*B29D 35/12*    (2010.01)
*A43B 1/00*     (2006.01)
(Continued)

(52) U.S. Cl.
CPC .......... *B29D 35/122* (2013.01); *A43B 1/0009* (2013.01); *A43B 13/186* (2013.01);
(Continued)

(58) Field of Classification Search
CPC ..... B29C 64/10; B29C 64/147; B29C 64/153; B29C 64/171; B29C 64/40; B29D 35/122; B33Y 50/00
See application file for complete search history.

(56) References Cited

U.S. PATENT DOCUMENTS

| | | |
|---|---|---|
| 10,016,941 B1 | 7/2018 | Beard |
| 2014/0109440 A1 | 4/2014 | McDowell et al. |

(Continued)

FOREIGN PATENT DOCUMENTS

| | | |
|---|---|---|
| CN | 207285371 U | 5/2018 |
| CN | 109363295 A | 2/2019 |
| GB | 2571806 A | 9/2019 |

OTHER PUBLICATIONS

Troy Nachtigall et al.: "ONEDAY Shoes", Tangible, Embedded, and Embodied Interation, ACM, 2 Penn Plaza, Suite 701 New York, NY 10121-0701 USA, Jan. 7, 2018 (Jan. 7, 2018), pp. 105-115, XP058428489, DOI: 10.1145/3294109.3295637, ISBN: 978-1-4503-6196-5, p. 1, second column-p. 2, first column; figures 1,5.
(Continued)

*Primary Examiner* — Stella K Yi

(57) ABSTRACT

A cupsole for footwear, said cupsole comprising at least a sidewall, a bottom surface and a central portion and wherein said sidewall circumscribes the central portion, said central portion having openings, preferably in the form of at least one honeycomb structure and wherein at least the sidewall and the bottom surface of the cupsole have a solid structure with no openings and wherein the complete cupsole is customized on the base of specific and measured data obtained directly from the user and printed in 1 single 3D printing step thereby using a thermoplastic polymer.

16 Claims, 2 Drawing Sheets

(51) Int. Cl.
  *A43B 13/18*   (2006.01)
  *B29K 75/00*   (2006.01)
  *B33Y 10/00*   (2015.01)
  *B33Y 80/00*   (2015.01)

(52) U.S. Cl.
  CPC .......... *B33Y 80/00* (2014.12); *B29K 2075/00* (2013.01); *B33Y 10/00* (2014.12)

(56)                    References Cited

U.S. PATENT DOCUMENTS

2015/0223560 A1*  8/2015  Wawrousek .......... A43B 13/223
                                                       36/25 R
2016/0374431 A1* 12/2016  Tow .................... A43D 1/022
                                                         36/43

OTHER PUBLICATIONS

WTVC NewsChannel 9: "Made in Our Hometown: Feetz Creates 3D Shoes", Nov. 14, 2014 (Nov. 14, 2014), XP054977865, Retrieved from the Internet: URL: https://www.youtube.com/watch?v=9Qs5Pj6r2a8 [retrieved on Nov. 10, 2017] the whole document.
International Search Report received in corresponding PCT Application PCT/EP2020/081262 completed Feb. 3, 2021 and mailed Feb. 11, 2021.
Written Opinion received in corresponding PCT Application PCT/EP2020/081262 completed Feb. 3, 2021 and mailed Feb. 11, 2021.
Office Action issued Jan. 25, 2024 for Chinese Corresponding Application No. 202080077317.9.

\* cited by examiner

3D PRINTED CUSTOMIZED CUPSOLES

CROSS-REFERENCE TO RELATED APPLICATIONS

This application is the National Phase of International Application PCT/EP2020/081262 filed Nov. 6, 2020 which claims priority to EP Provisional App. No. 19/207,877.2 filed Nov. 8, 2019. The noted applications are incorporated herein by reference.

FIELD OF INVENTION

The present invention relates to a three dimensional (3D) printed custom fit cupsole for footwear and a method for making said cupsole using additive manufacturing.

In particular, the present invention relates to a cupsole comprising a personalized printed structure which is custom made and obtained by personal biometric data directly obtained from the foot of a user, transforming such data into a scanned footprint, and subsequently printing the three-dimensional cupsole using state of the art additive manufacturing techniques such as Selective Laser Sintering (referred to as SLS); Stereolithographic printing (referred to as SL or SLA) and Fused Deposition Modelling (referred to as FDM).

BACKGROUND OF THE INVENTION

Cupsoles are known as a shoe outsole type, typically made of one piece of material. The sole unit is usually molded and made from 1 material such as rubber, ethylene vinylacetate (EVA), polyurethane, . . . . These type of soles are typically fabricated using injection molding techniques. The disadvantage of this type of sole is its uniform hardness along the sole and lack of customised fit. A customised fit was only possible by inserting and/or combining said cupsole with tailormade midsoles.

Three-dimensional (3D) printing is an additive printing process used to make three-dimensional solid objects such as shoe soles from a digital model. 3D printing techniques are considered additive processes because they involve the application of successive layers of material. This is unlike traditional machining processes, which often rely upon the removal of material to create the final object. Materials used in 3D printing often require curing or fusing, which for some materials may be accomplished using heat-assisted extrusion or sintering, and for other materials may be accomplished using UV laser and/or digital light projection technology.

Additive manufacturing processes utilize various materials and process techniques in order to build up objects in layers. In fused deposition modelling (FDM), for example, a thermoplastic polymer wire (filament) is liquefied and deposited in layers by means of a nozzle on a movable building platform. On solidification, a solid object is formed. Control of the nozzle and the building platform is done on the basis of a CAD drawing of the object.

Stereolithographic (referred to as SL or SLA) 3D printing is an additive manufacturing process which is liquid based in order to build up objects in layers. In Stereolithographic Apparatus (SLA), an object is created by selectively curing a polymer resin layer-by-layer using an ultraviolet (UV) laser beam. The materials used in SLA are curable photo-sensitive polymers that come in a liquid form.

There are additive manufacturing processes which utilize thermoplastic powders in order to build up objects in layers. Here, thin powder layers are applied by means of a coater and subsequently selectively melted by means of an energy source. The surrounding powder supports the component geometry in this case. Powder-based additive manufacturing processes are among the most economical additive processes on the market. They are therefore predominantly employed by industrial users. An example of a powder-based additive manufacturing process is selective laser sintering (SLS). In the laser sintering process, the energy is introduced by means of a laser beam in order to melt thermoplastic powders selectively.

Additive manufacturing is hence an ideal technique to make tailor made shoe soles. However, the shoe soles used to make tailor made cupsoles are usually either a combination of several sole structures that need to be combined and/or a midsole that needs to be inserted in the shoe.

For example, US20140109440 discloses a shoe comprising a cup outsole having an at least partially transparent side wall, which circumscribes a midsole housing formed in a central portion of the cup outsole. A shoe upper is attached to the cup outsole and a laser-sintered midsole is removably inserted into the midsole housing of the cup outsole. This cupsole fabrication requires multiple fabrication stages and has a combination of several structures that need to be combined in order to have a tailor-made shoe (sole).

Furthermore, tailor made 3D printed shoe soles have a cellular structure which make them ideal for adapting the mechanical behaviour of the shoe sole towards the specific characteristics of the foot but that cellular structure has the disadvantage of dirt and/or dust being penetrated into the sole. Further that type of sole having a cellular structure lacks mechanical support for the foot and therefore a sidewall structure is required.

To solve above cited problems, there is a need to further improve the state-of-the-art additive manufacturing processes (3D printing) for making cupsoles.

AIM OF THE INVENTION

It is a goal of the invention to improve the state of the art in the field of (cup) soles for footwear through the production of a sole for footwear that is customized on the base of specific and measured data obtained directly from the user or available in a database as a result of previous measurements. Such measurements can be used for the design and production of the sole.

It is a further aim of this invention to provide a tailormade cupsole for footwear that conforms in a continuous manner to the specific characteristics of the foot.

A further aim of the present invention is to provide a cupsole for footwear that is easy to produce at competitive costs in 1 single 3D production step (print), thereby avoiding the need for a midsole and/or outersole.

A still further goal of the present invention is to provide a cupsole that allows to save material and which is therefore more respectful of the environment and ecological.

Definitions and Terms

In the context of the present invention the following terms have the following meaning:
1) The term "polyurethane", as used herein, is not limited to those polymers which include only urethane or polyurethane linkages. It is well understood by those of ordinary skill in the art of preparing polyurethanes that the polyurethane polymers may also include allophanate, carbodiimide, uretidinedione, and other linkages in addition to urethane linkages.
2) The term "thermoplastic" as used herein refers in its broad sense to designate a material that is reprocessable at an elevated temperature, whereas "thermoset" designates a material that exhibits high temperature stability without such reprocessability at elevated temperatures.
3) Selective laser sintering (SLS) is an additive manufacturing (AM) technique that uses a laser as the power source to sinter powdered (polymeric) material aiming the laser automatically at points in space defined by a 3D model, and fusing the material together to create a solid structure. The laser melts at least the outer surface of the particles thereby fusing the (polymeric) cores to each other and to the previous layer and thereby transferring the powdered (polymeric) material into a mass that has a desired three-dimensional shape. The SLS process according to the inventions aims to create fusion and creation of covalent bondings between the powdered (polymeric) material thereby additionally using a radical curing source.
4) Stereolithographic printing (SLA, SL) is a form of 3D printing technology for the production of 3D objects in a layer by layer fashion using photochemical (actinic chemical) processes by which light causes chemical monomers in a liquid polymer resin to link (cure) together to form polymers. A light source (laser, UV light, visible light, . . . ) is used as the power source to cure a liquid polymer resin aiming the light source automatically at points in space defined by a 3D model, and fusing the material together to create a solid structure. Alternative abbreviations used in industry for this type of 3D printing technique thereby are DLP (Digital Light Processing or Digital Light Projector), LCD (Liquid Crystal Display), CDLP (Continuous Digital Light Processing), CLCD (Continuous Liquid Crystal Display) and CLIP (Continuous Liquid Interphase Printing and/or Continuous Light Induced Processing and/or Continuous Light Induced Polymerization). All these techniques, and techniques derived therefrom, are falling in the scope of the invention for the use of the curable polyurethane-based resin according to the invention.
5) Fused deposition modelling (FDM) or Fused filament fabrication (FFF) is a form of 3D printing technology for the production of 3D objects wherein a thermoplastic polymer wire (filament) is liquefied and deposited in layers by means of a nozzle on a movable building platform. The thermoplastic polymer may be a thermoplastic polyurethane (TPU).
6) The term "multi-material printing" as referred to herein is a 3D printing technique that uses more than 1 printing material during the 3D printing step. Using Multi-material printing allows to make objects composed of complex and heterogeneous arrangements of materials.
7) The term "compression hardness", also referred to as Compression Load Deflection (CLD) refers to the compression load deflection at 10% compression measured according to ISO 3386/1.
8) The term "room temperature" refers to temperatures of about 20° C., this means referring to temperatures in the range 18° C. to 25° C. Such temperatures will include, 18° C., 19° C., 20° C., 21° C., 22° C., 23° C., 24° C., and 25° C.
9) "Cupsole" is known and referred to as a shoe outsole that has a tall "sidewall". The sidewall cradles or "cups" the upper of the shoe, hence the name "cupsole".
10) A "honeycomb" structure or geometry must be interpreted as a structure/geometry having a uniform 2-dimensional array of hollow cells (openings). The geometry of honeycomb structures can vary widely herein but the common feature of said structures herein is an array of hollow cells (openings) formed between thin vertical walls (meaning that the cells are columnar in shape). Most often cells are hexagonal in shape. The geometry of honeycomb structures is different from the geometry of a cellular bearing structure which has a 3-dimensional array of hollow cells wherein the cells are not columnar in shape.
11) "Shore hardness" is a measure of the hardness of a (thermoplastic) material and is reflecting the resistance of a material to penetration of a spring-loaded needle-like indenter. The hardness is indicated by Shore scales. Shore A scale is used for testing soft thermoplastic materials while Shore D scale is used for testing harder thermoplastic materials. Shore hardness is measured according to DIN 53 505.

DETAILED DESCRIPTION

Classic cupsoles are always made of an easily mouldable material like rubber, polyurethane (PU) and natural latex.

This invention relates to a 3D printed, custom fit cupsole comprising a non-cellular bearing structure.

The ultimate goal would be to provide a method for making a cupsole for footwear wherein said method and/or cupsole is characterized as follows:
 A cupsole which is tailormade in a continuous manner to the specific characteristics of the foot.
 A cupsole which is easily produced at competitive costs in 1 single 3D production step (print), thereby avoiding the need for a midsole and/or outsole.
 A cupsole which is made of a thermoplastic material which is thermally recyclable and melt reprocessable after its service-life.
 A cupsole which has a design that allows to save material and which is therefore more respectful of the environment and ecological.
 A cupsole which can be used as such and attached directly to a shoe upper.

The advantage of the 3D printed cupsole according to the invention is that said cupsole can be used as such without the need to further attach or insert further sole parts. This might be achieved by using "multi-material printing" during the 3D printing step.

A further advantage of the cupsole according to the present invention is the fact that the cupsole as such is tailor made to fit a scanned footprint. No further assembly is needed, the printed structure can be used directly as cupsole and combined with the upper of the shoe.

Any thermoplastic polymer material suitable for use in an additive manufacturing technique can be used to manufacture the cupsole according to the present invention as well as any type of additive manufacturing technique may be applied to print the cupsole according to the present invention.

The invention therefor discloses a method for forming a customized cupsole (1) for footwear using additive manufacturing techniques (3D printing), said cupsole comprising at least a sidewall (2), a bottom surface (4) and a central portion (3) and wherein said sidewall (2) circumscribes the central portion (3), said central portion (3) having openings, preferably in the form of at least one honeycomb structure and wherein at least the sidewall (2) and the bottom surface (4) of the cupsole have a solid structure with no openings and wherein the complete cupsole is customized on the base of specific and measured data obtained directly from the user and printed in 1 single 3D printing step (additive manufacturing) thereby using a thermoplastic polymer.

The invention therefore discloses a cupsole (1) for footwear, said cupsole comprising at least a sidewall (2), a bottom surface (4) and a central portion (3) and wherein said sidewall (2) circumscribes the central portion (3).

According to embodiments, the central portion (3) of the cupsole (1) is having at least one honeycomb structure. The advantage of a honeycomb structure is to allow the minimization of the amount of used material to reach minimal weight and minimal material cost. Due to the geometry of honeycomb structures an array of hollow cells is formed between thin vertical walls which makes it easy to remove e.g. left over of non-reacted polymeric material e.g. powder. A further advantage of a honeycomb shaped structure is that cupsoles are created with minimal density and relative high out-of-plane compression properties and out-of-plane shear properties.

According to embodiments, the central portion (3) of the cupsole may comprise at least one honeycomb structure which extends along the entire length (longitudinal) and width (side-to-side) of the central portion in between the sidewalls.

According to embodiments, the central portion (3) of the cupsole may comprise at least one honeycomb structure which extends only part of the length (longitudinal area) and/or part of the transverse (side-to-side area) of the central portion (3) in between the sidewalls (2), the remaining parts having a solid structure with no openings. This design might be beneficial for support and/or orthopaedic reasons.

According to embodiments, the cupsole (1) of the invention is comprising at least a sidewall (2), a bottom surface (4), a central portion (3) and an upper surface (5) wherein said sidewall (2) circumscribes the central portion (3) having openings, preferably in the form of at least one honeycomb structure, and the bottom surface (4) and the upper surface (5) of the cupsole have a solid structure with no openings and the central portion being captured between the upper and bottom surface. The upper surface (5) of the cupsole may thereby act as a midsole thereby avoiding the need for a separate midsole. The material of the upper surface (5) might be such that it enhances the comfort and/or damping of the foot.

The cupsole according to the invention is able to provide areas that perform different properties and/or shapes without discontinuity from area to area. In particular, the openings in the central portion (3) of the midsole might be locally different from point to point or from area to area. To achieve this, the honeycomb structure in the central portion (3) might vary in density. The difference in density along the length (longitudinal area) and/or along the width (side-to-side area) of the central portion (3) might be achieved by using different types of thermoplastic materials. Alternatively, the size of the openings within the at least one honeycomb structure is varied from area to area in a gradual and/or discontinuous manner. Unlike what happens with traditional midsoles or soles, discontinuities between zones having different functions, such as support are herewith avoided.

The cupsole according to the invention is able to mimic the anatomy, the distribution of user loads in a more accurate way than with traditional soles or soles equipped with inserts having special functions or anatomy. In this way, it is possible to meet specific user needs or requests.

According to embodiments, the thermoplastic polymers used to produce the cupsole according to the present invention are the materials suitable to be used in above mentioned 3D printing techniques. For example, such materials include, among others acrylonitrile butadiene styrene (ABS), thermoplastic polyurethane (TPU) or polyamide (PA), thermoplastic elastomers, curable resins, or metals or ceramic materials, etc.

According to embodiments, the 3D printing step used to manufacture the cupsole according to the invention is selected from selective laser sintering (SLS) and the thermoplastic polymer is selected from a thermoplastic polymer powder having an average particle size below <250 μm and comprising cross-linkable thermoplastic polymer compounds having radically polymerizable unsaturation(s).

According to embodiments, the 3D printing technique is selected from Selective laser sintering (SLS) and the thermoplastic polymer is selected from thermoplastic polyurethane.

Examples of suitable thermoplastic polyurethane powders are commercially available IROPRINT® P powders from Huntsman.

According to embodiments, the 3D printing step used to manufacture the cupsole according to the invention is selected from stereolithographic printing (SLA).

According to embodiments, the 3D printing technique is selected from Stereolithographic printing (SLA, SL) and the thermoplastic polymer is selected from thermoplastic polyurethane resins. Examples suitable thermoplastic polyurethane resins are commercially available IROPRINT® R resins from Huntsman.

According to embodiments, the 3D printing step used to manufacture the cupsole according to the invention is selected from fused deposition modelling (FDM).

According to embodiments, the 3D printing technique is selected from fused deposition modelling (FDM) and the thermoplastic polymer is selected from thermoplastic polyurethane filaments. Example of suitable thermoplastic polyurethane filaments are commercially available IROPRINT® F filaments from Huntsman.

According to embodiments, a combination of thermoplastic polymers is used in the 3D printing step. The use of different materials may be achieved by "multi-material printing" during the 3D printing step.

According to embodiments, a combination of at least two different thermoplastic polymers may be used. The side wall (2) of the cupsole and the central portion (3) having a honeycomb structure of the cupsole may be made using a first thermoplastic polymer and the closed bottom part having a solid structure with no openings may be made from a second thermoplastic polymer.

According to embodiments, a combination of at least three different thermoplastic polymers may be used. The side wall (2) of the cupsole may be made using a first thermoplastic polymer, the central portion (3) having a honeycomb structure may be made from a second thermoplastic polymer and the closed bottom part (3) having a solid structure with no openings may be made from a third thermoplastic polymer.

According to embodiments, a combination of at least two different thermoplastic polymers may be used to print the central portion (3) of the cupsole. A first thermoplastic polymer, might be used for the heel part of the central portion (4), a second thermoplastic polymer might be used for the middle part of the central portion (4) and a third thermoplastic polymer might be used to print the tip part of the central portion (4). The thermoplastic polymer used to print the heel part of the central portion (3) might be selected from a thermoplastic polymer having a higher hardness compared to the thermoplastic polymer used to print the tip and middle part of the central portion (3) of the cupsole. Most preferably the different thermoplastic polymers are selected from thermoplastic polyurethanes. A suitable thermoplastic polyurethane used for the central portion (3) of the cupsole may have a hardness in the range 85 Shore A up to 50 Shore D.

According to embodiments, the printed honeycomb structure in the central portion (3) of the cupsole might vary in density. This might be achieved by a variation in diameter of the hollow cells in the honeycomb structure (smaller cell sizes leading to higher densities).

According to embodiments, a combination of at least two different thermoplastic polymers may be used to print the central portion (3) of the cupsole and the printed honeycomb structure in the central portion (3) of the cupsole might vary in density. This might lead to a cupsole having a central portion (3) with several honeycomb structures (see 7a, 7b, 7c, 7d) which vary not only in shape but also in thermoplastic materials. Most preferably the different thermoplastic polymers are selected from thermoplastic polyurethanes.

According to embodiments, the first, second and third thermoplastic polymer are selected from thermoplastic polyurethane.

According to embodiments, the thermoplastic polymer is further comprising fillers to improve the mechanical properties of the thermoplastic polymer. Suitable fillers might be selected from silica, CaCO$_3$ BaSO$_4$, . . . .

According to embodiments, the thermoplastic polymer is further comprising additives such as colorants, pigments, anti-static compounds, fire retardants, . . . .

According to embodiments, the weight of the sole may be adapted by varying the size of the openings in the honeycomb structure. A denser honeycomb structure will lead to a higher density and higher weight. For example, some areas in the cupsole might require a higher density for support reasons e.g. at the heel portion while a less dens honeycomb structure may be required in the middle of the cupsole.

Furthermore, the invention provides a method for making a shoe comprising the cupsole according to the invention. Said method comprising at least following steps
  Providing a shoe upper, and
  Providing the cupsole, and
  Contacting the shoe upper to the cupsole, and
  Performing an adhesion step to permanently attach the shoe upper to the cupsole.

According to embodiments, the step of attaching the shoe upper to the cupsole is performed by a thermal treatment of at least the sidewalls of the cupsole above the melting temperature $T_m$ of the thermoplastic material such that the upper of the shoe is melted onto the cupsole. In case the thermoplastic material of the cupsole is thermoplastic polyurethane, melt temperatures of between 150° C. and 220° C. are used. With some hard grades, a melt temperature of up to 240° C. may be needed. This way a seamless and glue free shoe can be manufactured.

According to embodiments, the step of attaching the shoe upper to the cupsole is performed by applying an adhesive, said adhesive can be applied digitally during the 3D printing step. Said adhesive might be thermoplastic TPU.

According to embodiments, the cupsole is made using TPU filaments in an FDM printer and the step of attaching the shoe upper to the cupsole is performed by printing a TPU adhesive (thereby using adhesive TPU filaments) and said TPU adhesive is applied digitally during the 3D FDM printing step. The application of adhesive TPU filaments make the process especially quick and efficient.

According to embodiments, the complete shoe including cupsole and shoe upper is manufactured in 1 and the same 3D printing technique. The thermoplastic material used to print the cupsole and shoe upper might be the same or alternatively are selected from at least 2 different thermoplastic materials which are compatible with each other. Preferably the thermoplastic material is selected from thermoplastic polyurethane.

By using multi-material printing during the 3D printing step, it is possible to print a complete shoe comprising the cupsole of the invention, thereby eliminating the need for further assembly and reduce the need for post-processing stages (e.g., colouring). There are several ways in which you can have 3D print with multiple materials. You can use an FDM printer equipped with several nozzles and/or you can pause the printing process and exchange the filament at any point during the printing.

FIGURES

The Figures illustrate, by way of example, the principles of the invention. The invention is however not limited hereto.

Figure 1:
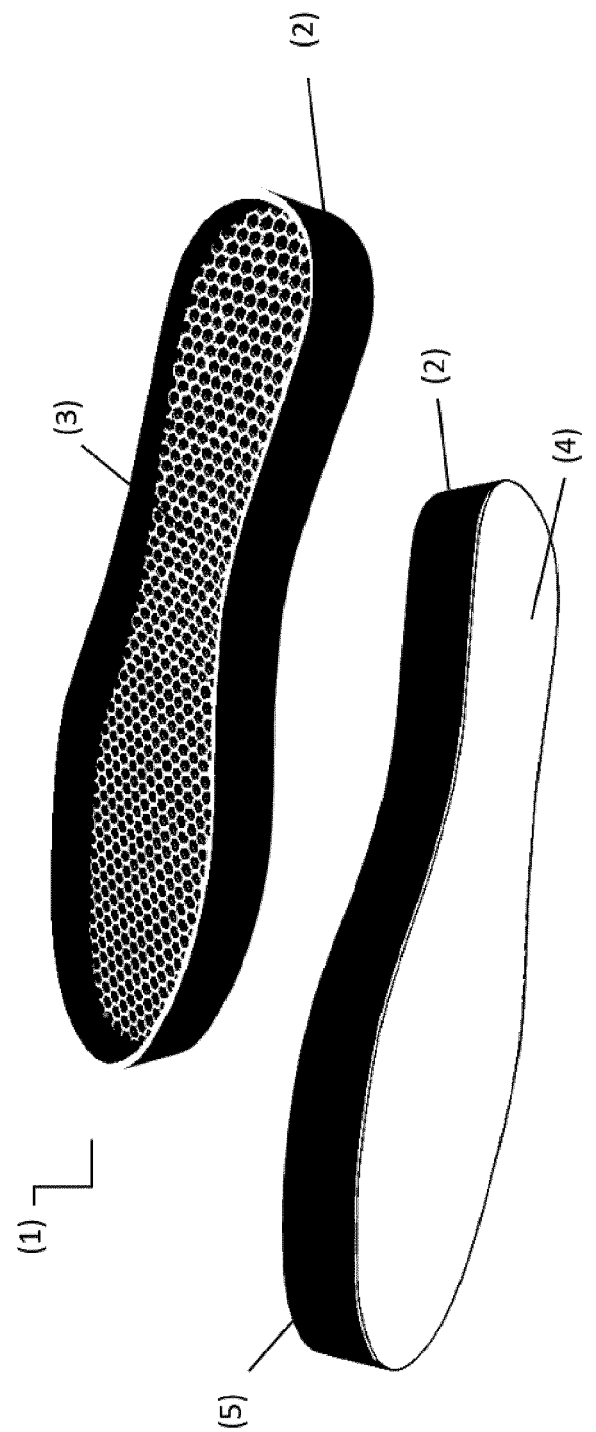
FIG. 1 is a perspective view of one version of a cupsole (1) according to the present invention comprising a sidewall (2), a bottom surface (4) and a central portion (3) and wherein said sidewall (2) circumscribes the central portion (4), said central portion having openings, preferably in the form of at least one honeycomb structure seen from the upper side and bottom side.
Figure 2:
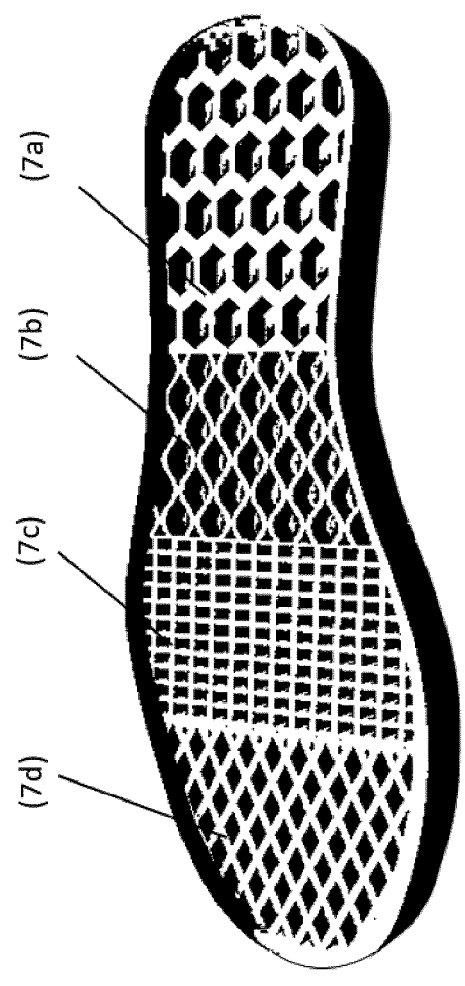
FIG. 2 is a perspective view of another version of a cupsole (6) according to the present invention thereby illustrating some examples of suitable honeycomb structures (7a, 7b, 7c and 7d).

The invention claimed is:

1. A method for forming a customized cupsole (1) for footwear using 3D printing techniques, said cupsole comprising at least a sidewall (2), a bottom surface (4) and a central portion (3) and wherein said sidewall (2) circumscribes the central portion (3), said central portion (3) having openings in the form of at least one honeycomb structure defined by vertical walls, and wherein at least the sidewall (2) and the bottom surface (4) of the cupsole have a solid structure with no openings and wherein the complete cupsole is customized on the base of specific and measured data obtained directly from a user and printed in one single 3D printing step using at least three different thermoplastic polymers, wherein the sidewall (2) comprises a first thermoplastic polymer, the central portion (3) comprises a second thermoplastic polymer having a shore hardness in a range from 85 Shore A up to 50 Shore D as measured according to DIN 53 505, and the bottom surface (4) comprises a third thermoplastic polymer.

2. The method according to claim 1, wherein the central portion of the cupsole comprises at least one honeycomb structure which extends along the entire length (longitudinal) and width (side-to-side) of the central portion in between the sidewalls.

3. The method according to claim 1, wherein the central portion of the cupsole comprises at least one honeycomb structure which extends to only part of the length (longitudinal area) and/or part of the width (side-to-side area) of the central portion in between the sidewalls, the remaining parts having a solid structure with no openings.

4. The method according to claim 1, comprising at least a sidewall (2), a bottom surface (4), a central portion (3) and an upper surface (5) wherein said sidewall (2) circumscribes the central portion (3) having openings, and the bottom surface (4) and the upper surface (5) of the cupsole have a solid structure with no openings and the central portion being captured between the upper and bottom surface.

5. The method according to claim 1, wherein the central portion (3) having openings comprises more than one honeycomb structure and wherein at least two or more of the honeycomb structures differ in density.

6. The method according to claim 1, wherein the thermoplastic polymers are selected from acrylonitrile butadiene styrene (ABS), thermoplastic polyurethane (TPU), polyamide (PA), and curable thermoplastic resins.

7. The method according to claim 1, wherein the 3D printing technique used to manufacture the cupsole is selected from selective laser sintering (SLS) and the thermoplastic polymer is polymers are selected from thermoplastic polymer powder having an average particle size below <250 μm.

8. The method according to claim 1, wherein the 3D printing technique used to manufacture the cupsole is selected from selective laser sintering (SLS) and the thermoplastic polymers are selected from thermoplastic polymer powder having an average particle size below <250 μm and the thermoplastic polymers are selected from thermoplastic polyurethane (TPU) comprising cross-linkable TPU compounds having radically polymerizable unsaturation(s).

9. The method according to claim 1, wherein the 3D printing technique used to manufacture the cupsole is selected from stereolithographic printing (SLA).

10. The method according to claim 1, wherein the 3D printing technique used to manufacture the cupsole is selected from stereolithographic printing (SLA) and the thermoplastic polymers are selected from a thermoplastic polyurethane resin.

11. The method according to claim 1, wherein the 3D printing technique used to manufacture the cupsole is selected from fused deposition modelling (FDM).

12. The method according to claim 1, wherein the 3D printing technique used to manufacture the cupsole is selected from fused deposition modelling (FDM) and the thermoplastic polymers are selected from thermoplastic polyurethane filaments.

13. A method for making a shoe comprising the cupsole according to claim 1, said method comprising at least following steps
providing a shoe upper, and
providing the cupsole, and
contacting the shoe upper to the cupsole, and
performing an adhesion step to permanently attach the shoe upper to the cupsole.

14. The method according to claim 13, wherein the step of attaching the shoe upper to the cupsole is performed by a thermal treatment of at least the sidewalls of the cupsole above the melting temperature $T_m$ of the thermoplastic material such that the upper of the shoe is melted onto the cupsole.

15. The method for making a shoe comprising the cupsole according to claim 13, characterized in that the cupsole and shoe upper are printed using 3D printing techniques.

16. The method according to claim 15, wherein the thermoplastic polymers used to print the cupsole and shoe upper are selected from the same thermoplastic polymer or alternatively the thermoplastic polymers used to print the cupsole and shoe upper are selected from at least 2 different thermoplastic polymers which are compatible with each other thereby using multi-material 3D printing.

* * * * *